(12) United States Patent
Wakizaka

(10) Patent No.: US 8,599,221 B2
(45) Date of Patent: Dec. 3, 2013

(54) IMAGE DISPLAY DEVICES

(75) Inventor: Masaaki Wakizaka, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1030 days.

(21) Appl. No.: 12/056,259

(22) Filed: Mar. 26, 2008

(65) Prior Publication Data

US 2008/0238945 A1 Oct. 2, 2008

(30) Foreign Application Priority Data

Mar. 28, 2007 (JP) ................. 2007-083924

(51) Int. Cl.
*G09G 5/00* (2006.01)
*G06F 17/00* (2006.01)
*G06F 3/048* (2013.01)
*G06F 15/00* (2006.01)
*G06K 9/20* (2006.01)
*G06K 9/32* (2006.01)
*G06K 9/60* (2006.01)
*H04N 1/387* (2006.01)

(52) U.S. Cl.
USPC ........... 345/660; 345/619; 715/277; 715/788; 715/800; 715/801; 715/804; 715/805; 382/282; 382/298; 382/305; 358/1.2; 358/453

(58) Field of Classification Search
USPC ................ 345/616, 660–671, 156, 173–178; 715/800, 801, 864, 252, 273, 274, 277, 715/788, 798, 804, 805, 815, 838; 382/282, 382/298–301, 305, 306; 358/1.1, 1.2, 1.9, 358/448, 451–453
See application file for complete search history.

(56) References Cited

U.S. PATENT DOCUMENTS

| | | | | |
|---|---|---|---|---|
| 4,790,028 A | * | 12/1988 | Ramage | 382/298 |
| 7,064,858 B2 | * | 6/2006 | Iwai et al. | 358/1.2 |
| 2006/0022955 A1 | * | 2/2006 | Kennedy | 345/173 |
| 2006/0087520 A1 | | 4/2006 | Ito et al. | |
| 2007/0226646 A1 | * | 9/2007 | Nagiyama et al. | 715/784 |

FOREIGN PATENT DOCUMENTS

| | | |
|---|---|---|
| JP | 2004-94423 A | 3/2004 |
| JP | 2006-121551 A | 11/2006 |

* cited by examiner

*Primary Examiner* — Sajous Wesner
*Assistant Examiner* — Andrew Shin
(74) *Attorney, Agent, or Firm* — Baker Botts L.L.P.

(57) ABSTRACT

An image processing device includes a first display section configured to display an image, an input receiving device configured to receive an input associated with the image, and a computer processing unit (CPU). The CPU is configured to determine a selected portion of the image based on the input, to reduce a scaling factor associated with the selected portion of the image as an amount of time that the input device continuously receives the input increases, and to apply the scaling factor to the selected portion of the image to generate a scaled image. The device also includes a second display section configured to display the scaled portion of the image.

22 Claims, 14 Drawing Sheets

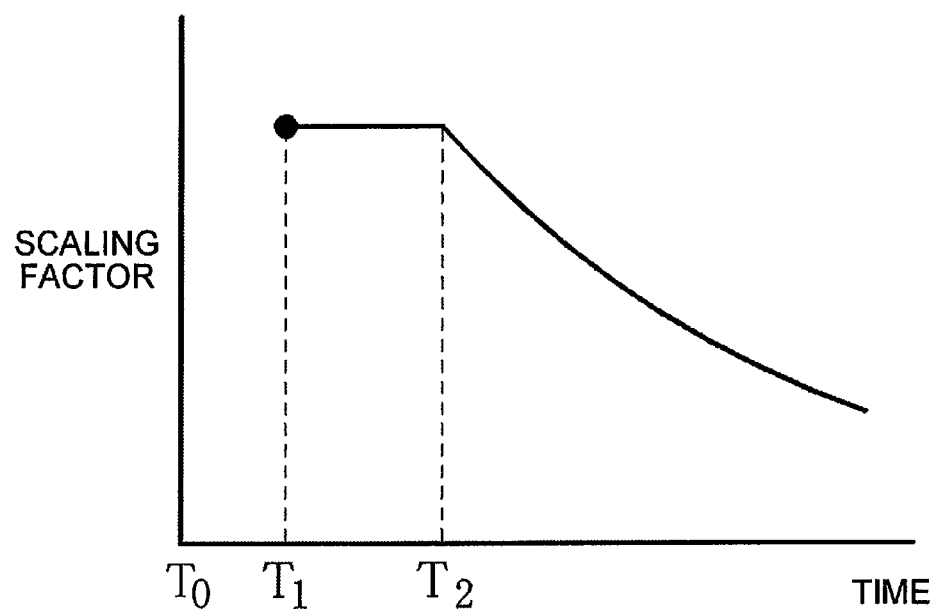

IMAGE DISPLAY DEVICES

CROSS REFERENCE TO RELATED APPLICATION

The present application claims priority from Japanese Patent Application No. 2007-083924, which was filed on Mar. 28, 2007, the disclosure of which is herein incorporated by reference in its entirety.

BACKGROUND OF THE INVENTION

1. Field of the Invention

The present invention relates generally to image display devices.

2. Description of Related Art

A known image processing device, such as the image processing device described in Japanese Laid-Open Patent Publication No. 2006-121551 and U.S. Patent Application Publication No. 2006/0087520 A1 comprises an image display apparatus comprising a sub window configured to display an enlarged portion of an image. In order to further enlarge a specific portion of the image displayed in the sub window, the specific portion to be enlarged may be designated on the sub window.

However, this known image display apparatus requires two operational steps to enlarge the specific portion of an image, which is cumbersome. In addition, a scaling factor needs to be continuously selected by a user, which may be inconvenient for the user. Moreover, only a single specific portion may be enlarged and displayed on the display at any given time.

SUMMARY OF THE INVENTION

Therefore, a need has arisen for image display devices which overcome these and other shortcomings of the related art. A technical advantage of the present invention is that the image display device readily may display the enlarged, specific portion of the image on the display, and may increase the ease with which the user may enlarge and display the specific portion of the image on the display. Another technical advantage of the present invention is that the user may enlarge and simultaneously display a plurality, e.g., a pair, of specific portions on the display.

According to an embodiment of the present invention, an image processing device comprises a first display section configured to display an image, an input receiving device configured to receive an input associated with the image, and a computer processing unit. The CPU is configured to determine a selected portion of the image based on the input, to reduce a scaling factor associated with the selected portion of the image as an amount of time that the input device continuously receives the input increases, and to apply the scaling factor to the selected portion of the image to generate a scaled image. The device also comprises a second display section configured to display the scaled portion of the image.

According to another embodiment of the present invention, an image processing device comprises a display device comprising a first display portion configured to display an image, a second display portion positioned adjacent to the first display portion, and an input receiving portion configured to receive an input. The device also comprises a computer processing unit configured to determine whether an input associated with the image has been received, select a portion of the image based on the input, and determine whether the input receiving portion continuously has received the input for at least a first predetermined amount of time. The CPU also is configured to determine whether the input receiving portion continuously has received the input for more than a second predetermined amount of time greater than the first predetermined amount of time, determine a scaling factor based on an amount of time that the input receiving portion continuously has received the input, and scale the portion of the image based on the scaling factor to generate a scaled portion of the image, wherein the second portion is configured to display the scaled portion of the image.

According to yet another embodiment of the present invention, an image processing device comprises means for receiving an image, means for displaying the received image, and means for determining whether an input associated with the image has been received. The device also comprises means for selecting a portion of the image based on the input after the input has been received, means for determining whether the input continuously has been received for at least a first predetermined amount of time after determining that the input has been received, and means for determining whether the input continuously has been received for more than a second predetermined amount of time greater than the first predetermined amount of time after determining that the input continuously has been received for at least the first predetermined amount of time. Moreover, the device comprises means for determining a scaling factor based on an amount of time that the input continuously has been received, means for scaling the portion of the image based on the scaling factor to generate a scaled portion of the image, and means for displaying the scaled portion of the image adjacent to the image.

According to still yet another embodiment of the present invention, a method of scaling comprises the steps of displaying an image, and receiving an input associated with the image, determining a selected portion of the image based on the input. The method also comprises the steps of reducing a scaling factor associated with the selected portion of the image as an amount of time that the input device continuously receives the input increases, applying the scaling factor to the selected portion of the image to generate a scaled image, and displaying the scaled portion of the image.

According to a further embodiment of the present invention, a method of scaling comprises the steps of receiving an image, displaying the received image, determining whether an input associated with the image has been received, and selecting a portion of the image based on the input after the input has been received. The method also comprises the steps of determining whether the input continuously has been received for at least a first predetermined amount of time after determining that the input has been received, and determining whether the input continuously has been received for more than a second predetermined amount of time greater than the first predetermined amount of time after determining that the input continuously has been received for at least the first predetermined amount of time. Moreover, the method comprises the steps of determining a scaling factor based on an amount of time that the input continuously has been received, scaling the portion of the image based on the scaling factor to generate a scaled portion of the image, and displaying the scaled portion of the image adjacent to the image.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

FIG. 14 is a graph showing changes in a scaling factor of an image, according to an embodiment of the present invention.

DETAILED DESCRIPTION OF EMBODIMENTS OF THE INVENTION

Embodiments of the present invention and their features and technical advantages may be understood by referring to FIGS. 1-14, like numerals being used for like corresponding portions in the various drawings.

Figure 1:
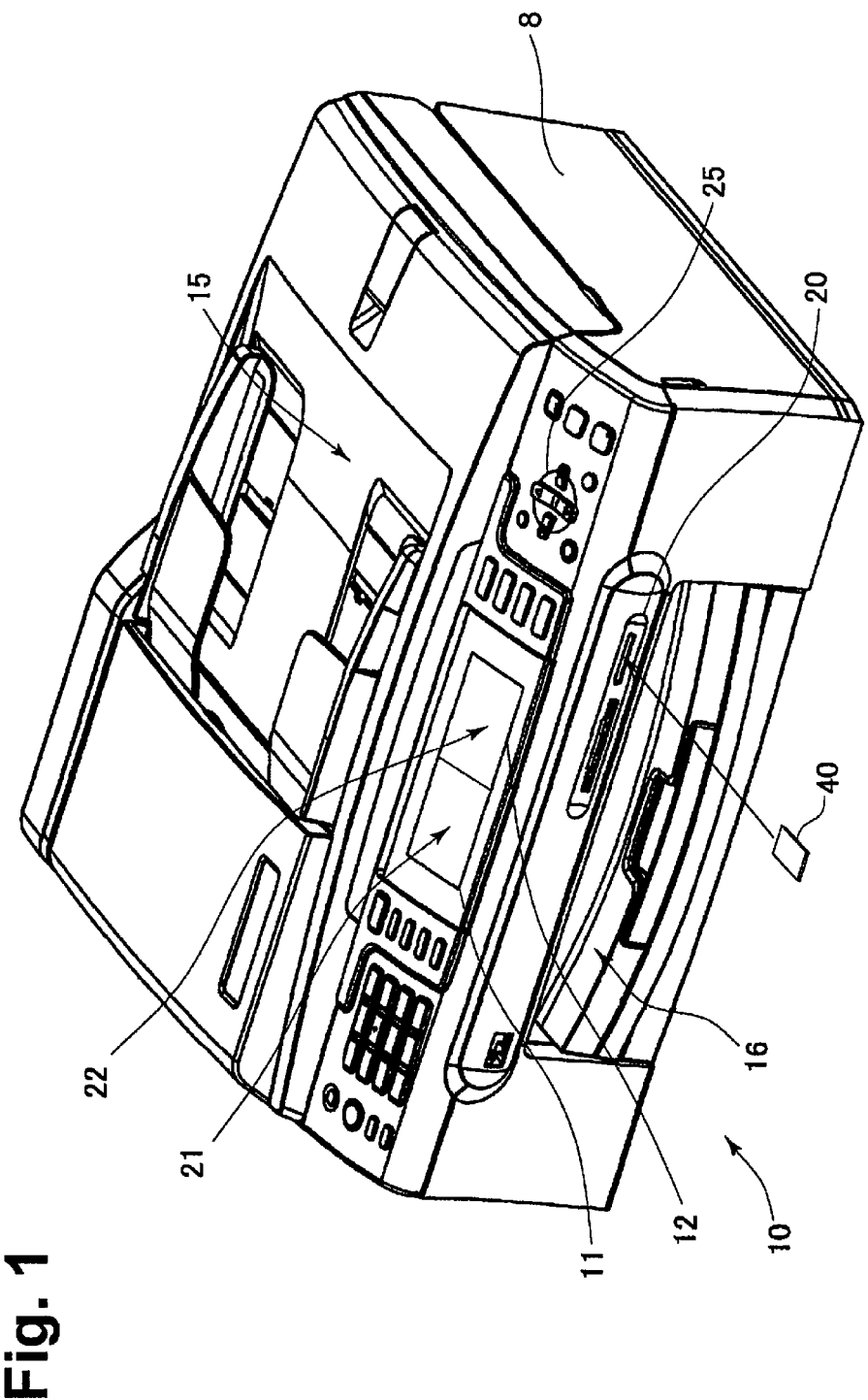
FIG. 1 is a perspective view of a multi-function device, according to an embodiment of the present invention.
Figure 2:
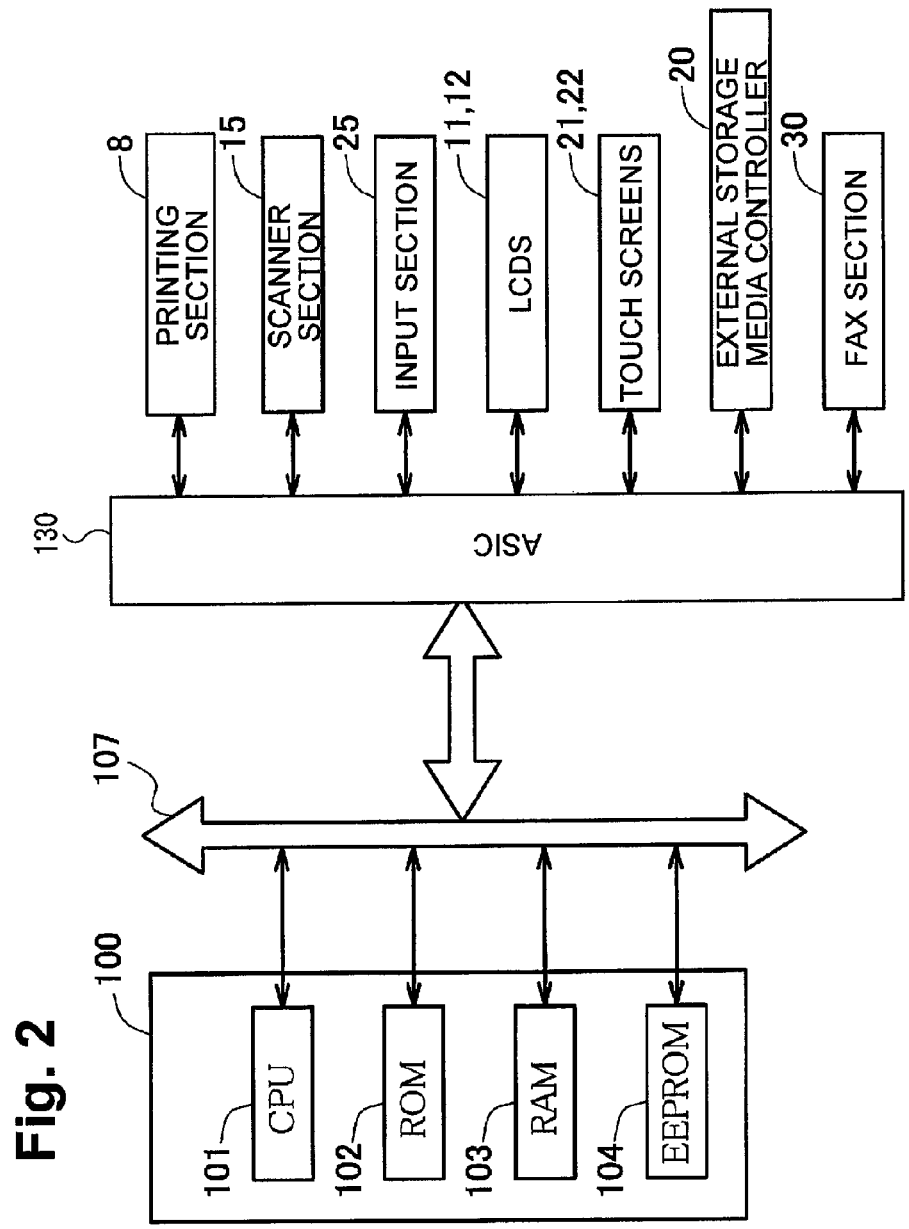
FIG. 2 is a block diagram of the multi-function device of FIG. 1.

Referring to FIGS. 1 and 2, an image display device, such as a multi-function device 10, e.g., a printer, may comprise a printing section 8. Recording medium, such as sheets of paper, may be positioned within a sheet feeding section 16. An image may be captured by a scanner section 15. A user may enter an input using an input section 25, which may comprise an end key. Multi-function device 10 may comprise displays 11, 12, such as liquid crystal displays (LCDs), configured to display information thereon. Displays 11, 12 may comprise touch screens 21, 22, respectively. A user may enter the input using touch screens 21, 22. An external storage media 40 may be inserted into a slot 20.

Referring to FIG. 2, multi-function device 10 may comprise a controller 100 configured to perform overall control of multi-function device 10. Controller 100 may comprise a CPU (central processing unit) 101, a ROM (read-only memory) 102, a RAM (random access memory) 103, and an EEPROM (electrically erasable programmable read-only memory) 104 which may be connected to a bus 107. Bus 107 may be connected to an ASIC (application specific integrated circuits) 130 configured to perform various information exchanges with components of multi-function device 10. ASIC 130 may be connected to printing section 8, scanner section 15, input section 25, LCDs 11, 12, touch screens 21, 22, an external storage media controller (slot) 20, and a fax section 30.

According to an embodiment of the present invention, LCD 11 may correspond to an image display section, and an image may be displayed in the image display section. Moreover, LCD 12 may correspond to a scaled image display section. In operation, a user may select a portion of the image in the image display section 11, e.g., by applying a force to the image display section 11 corresponding to the selected portion of the image. When the user selects the portion of the image, which occurs at a reference time T0, nothing may occur until the user continuously selects the portion of the image in the image display section 11, e.g., by continuously applying the force to the portion of the image display section 11 corresponding to the selected portion of the image, for a first amount of time, which corresponds to a first time T1. When the user continuously selects the portion of the image in the image display section 11 for the first amount of time, the scaled image display section 12 then may display the selected portion of the image. The size of the selected portion of the image displayed in the scaled image display section 12 may be enlarged with respect to the selected portion of the image displayed in the image display section 11, and may correspond to an actual size of the selected portion. When the user continuously selects the portion of the image in the image display portion 12 between the first time T1 and a second time T2, the selected portion of the image displayed in the scaled image display section 12 may remain unaltered, i.e., may not change. Nevertheless, if the user continues to continuously select the portion of the image in the image display section 11 after second time T2, a scaling factor may be applied to the selected portion of the image displayed in the scaled image display section 12, and the selected portion of the image displayed in the scaled image display section 12 may change, i.e., be scaled, based on the scaling factor. Specifically, as the user continues to continuously select the portion of the image in the image display section 11 after second time T2, the scaling factor continuously changes, such that the selected portion of the image displayed in the scaled image display section 12 also may continuously change based on the current scaling factor. In this manner, the user may scale a selected portion of an image using a single action, e.g., by merely selecting a portion of the image in the image display portion 11. For example, the selected portion of the image may be a relatively small portion of the image, and the scaling factor may be continuously decreased until a desired portion of the image in the image display portion 11 is displayed in the scaled image display section 12.

Figure 3:
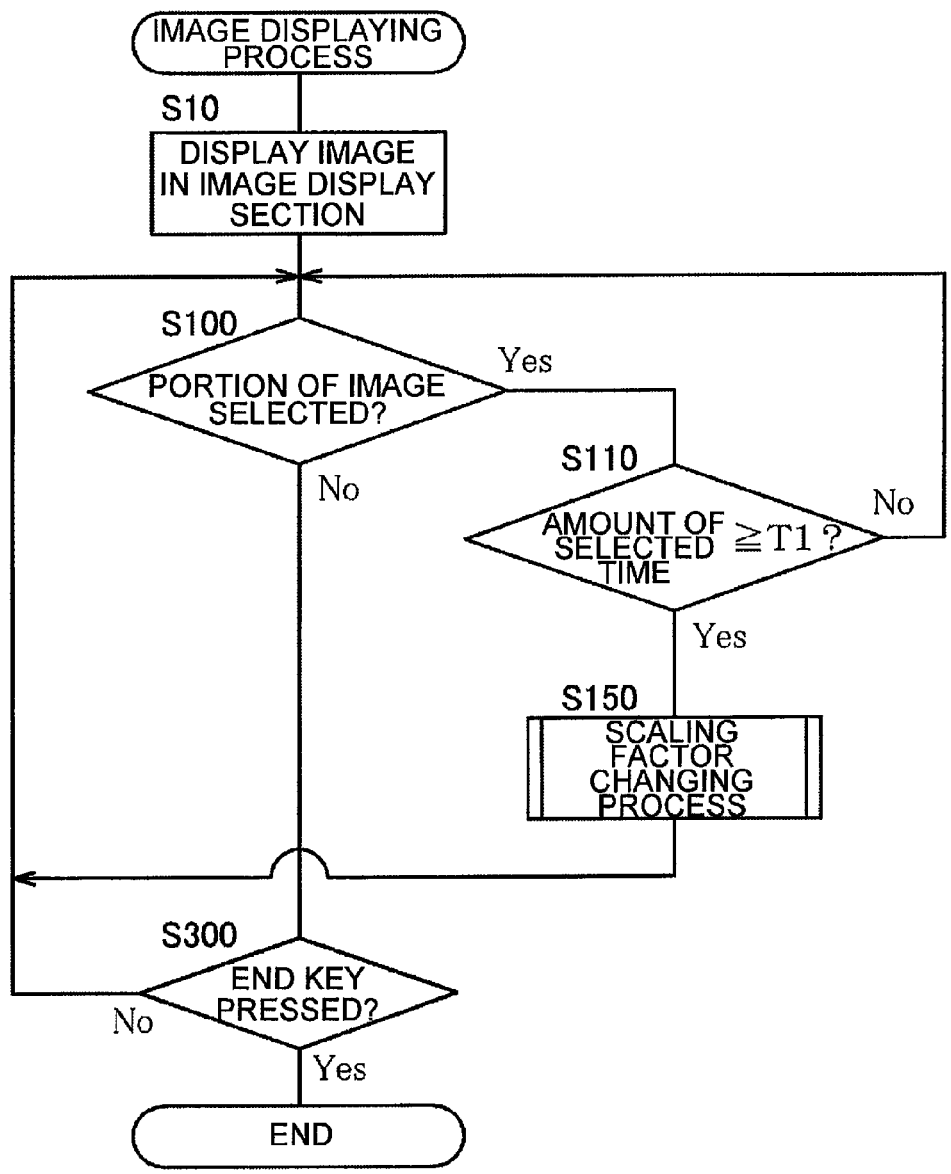
FIG. 3 is a flowchart of an image displaying process, according to an embodiment of the present invention.

Referring to FIG. 3, an image displaying process is depicted. In S10, an image may be displayed in image display section 11. CPU 101 may determine in S100 whether a portion of the image has been selected. For example, the portion of the image may be selected by touching touch screen 21 using a pen or with a finger.

When CPU 101 determines that the portion of the image has been selected (S100: Yes), flow proceeds to S10. When CPU 101 determines that the portion of the image has not been selected (S100: No), flow proceeds to S300. In S300, CPU 101 determines whether the end key has been selected (S300:Yes, the method ends; No: method returns to S:100). In S110, CPU 101 may determine whether the amount of time that the portion of the image has been continuously selected is greater than or equal to the first amount of time, which corresponds to first time T1.

When CPU 101 determines that the amount of time that the portion of the image has been selected is greater than or equal to first time T1 (S110: Yes), flow may proceed to S150 where a scaling factor changing process, according to an embodiment of the present invention, may be performed. When CPU 101 determines that the amount of time that the portion of the image has been selected is less than first time T1 (S110: No), flow may return to S100.

Figure 4:
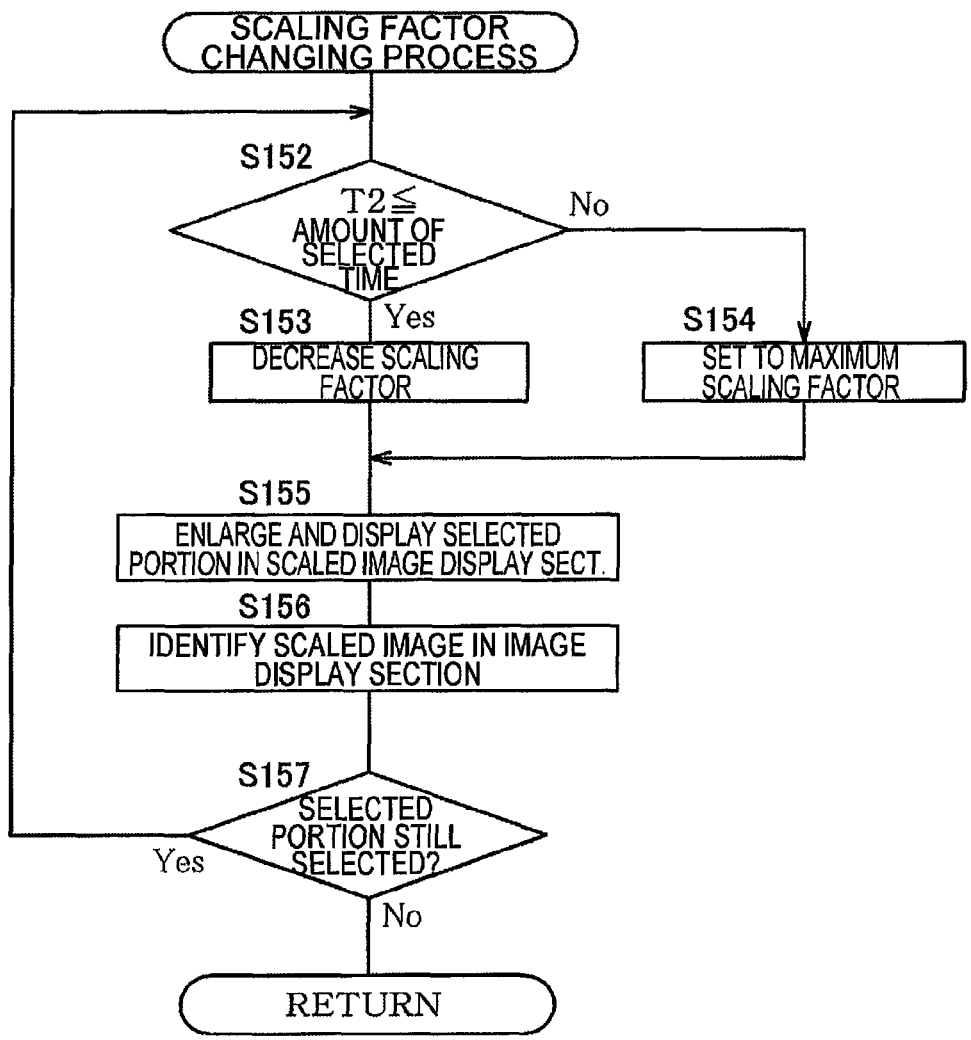
FIG. 4 is a flowchart of a scaling factor changing process, according to an embodiment of the present invention.

Referring to FIG. 4, S150 comprises S152-S157. In S152, CPU 101 determines whether the amount of time that the portion of the image has been selected is greater than or equal to second time T2. When CPU 101 determines that the amount of time that the portion of the image has been selected is greater than or equal to second time T2 (S152: Yes), flow proceeds to S153. In S153, a current scaling factor is determined. For example, as shown in FIG. 14, the current scaling factor may decrease as the time differential between the current time and second time T2 increases. Flow then proceeds to S155. Nevertheless, if CPU 101 determines that the amount of time that the portion of the image has been selected is less than second time T2 (S152: No), flow proceeds to S154. In S154, the scaling factor is set to a maximum scaling factor, and flow proceeds to S155.

In S155, the selected portion of the image may be enlarged and displayed in the scaled image display section 12, and the scaling factor determined in S153 or S154, which depends on the relationship between the amount of time that the portion of the image has been selected and second time T2, is applied to the selected portion of the image which is displayed in scaled image display portion 12, such that the selected portion of the image which is displayed in scaled image display section 12 is scaled. For example, when the applied scaling factor corresponds to the scaling factor determined in S153, the selected portion of the image which is displayed in scaled image display section 12 may be enlarged. Nevertheless, when the applied scaling factor corresponds to the scaling factor determined in S154, the selected portion of the image which is displayed in scaled image display section 12 may not be altered because the scaling factor is set to the maximum scaling factor. Flow then proceed to S156. In S156, the scaled image displayed in the scaled image display section 12 may be identified in the image display section 11. For example, a frame, e.g., a rectangular frame, may be depicted in the image display section 11, which surrounds those portions of the image which are displayed in the scaled image display section 12. Flow then may proceed to S157.

In S157, CPU 101 may determine whether the selected portion of the image still is selected. When CPU 101 determines that the selected portion of the image still is selected (S157: Yes), flow may return to S152, and the scaling factor changing process S150 may be repeated, e.g., the selected portion of the image displayed in the scaled image display section 12 continuously may be changed, e.g., enlarged, until either CPU 101 determines that the selected portion of the image no longer is selected or a minimum scaling factor is reached. When CPU 101 determines that the selected portion of the image no longer is selected (S157: No), the scaling factor changing process S150 ends.

Figure 8:
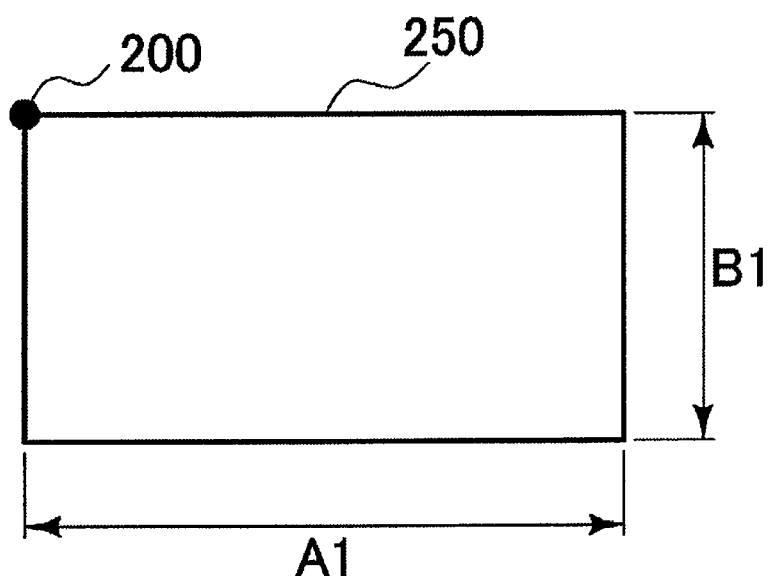
FIG. 8 is a schematic showing a selected input point and a rectangle defined thereby.

FIG. 8 shows a user selected point 200, e.g., selected using a pen or a finger, on image display section 11, and a frame, e.g., a rectangle 250, is generated based on selected point 200.

Rectangle 250 may have a length A1 and a width B1 which may designate a maximum scaling factor associated with point 200. A portion of the image defined in rectangle 250 may be displayed and then scaled, e.g., enlarged, on the scaled image display section 12.

Figure 9A:
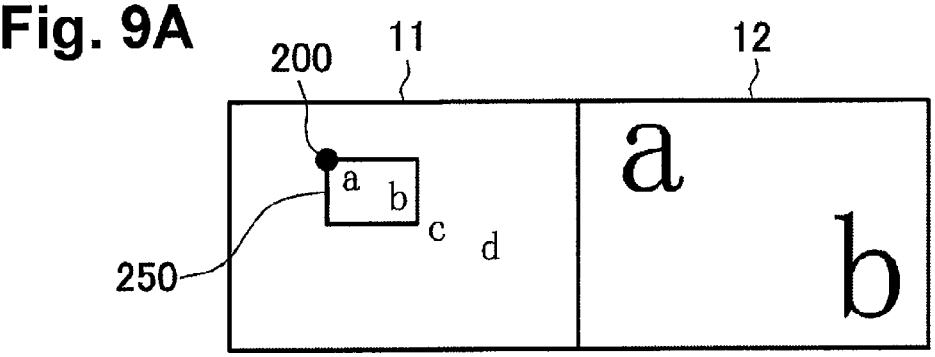
FIGS. 9A and 9B are schematics of an image display section and a scaled image display section, according to the embodiment of FIG. 3.
Figure 9B:
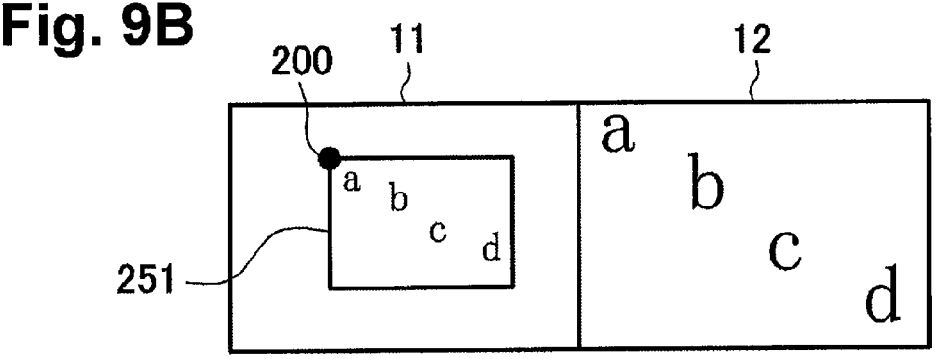

For example, point 200 may be selected on the image display section 11, as shown in FIG. 9A, and the dimensions of rectangle 250 may be determined. The portion of the image in the image display section 11 defined in rectangle 250 may be displayed in the scaled image display section 12. When S150 is performed, and the amount of time that the portion of the image has been selected is greater than or equal to second time T2, the scaling factor associated with the image in the scaled image display section 12 may be reduced. Accordingly, the size of rectangle 250 may increase, such that rectangle 250 is replaced by rectangle 251, as shown in FIG. 9B, and the size of the image displayed in the scaled image display section 12 increases.

Rectangles 250, 251 may be indicated by showing their outlines or contours or by showing their inside and outside in different colors.

Figure 5:
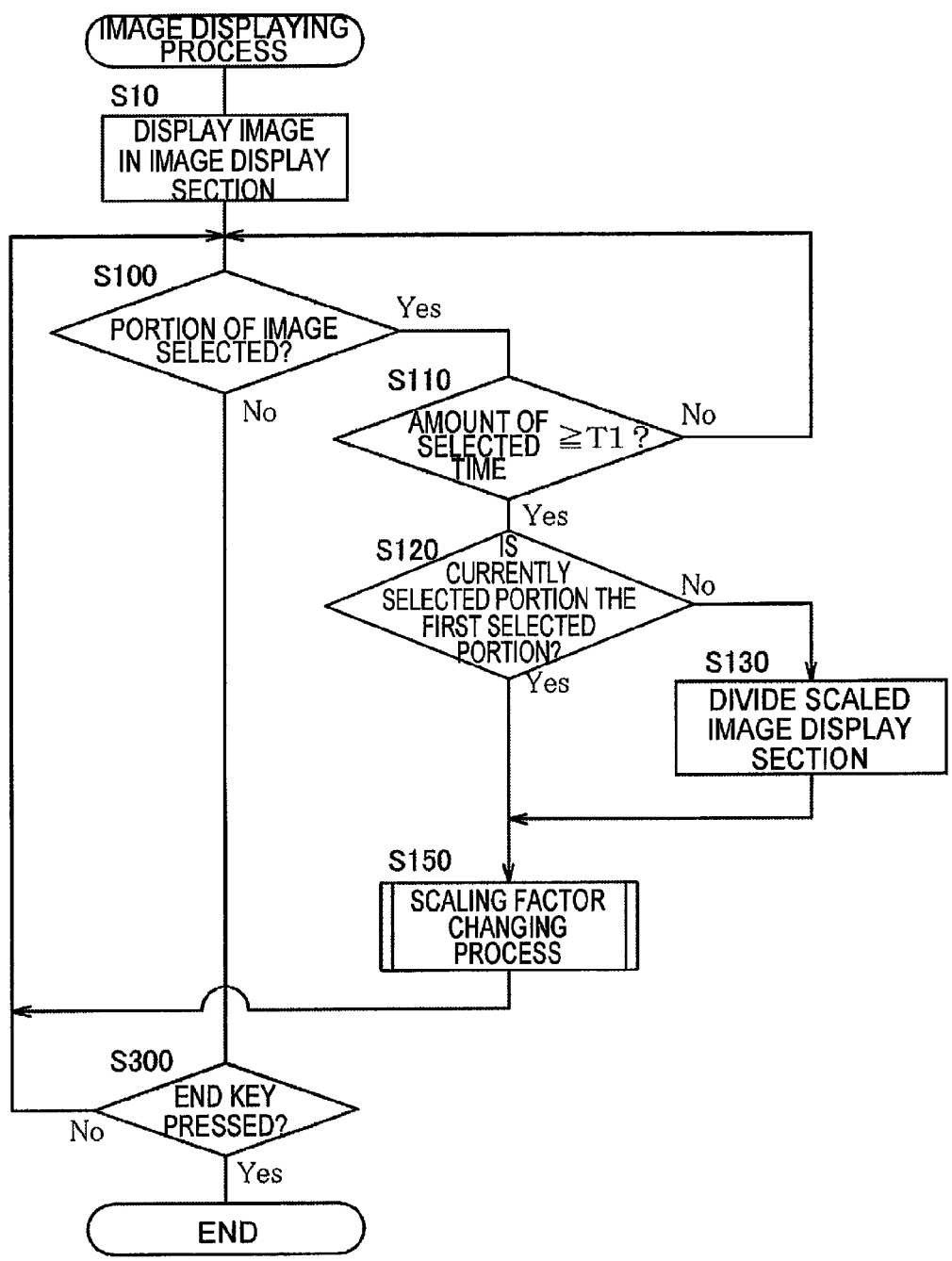
FIG. 5 is a flowchart of an image displaying process, according to another embodiment of the present invention.

Referring to FIG. 5, an image displaying process according to another embodiment of the present invention is depicted. The embodiment of FIG. 5 is substantially similar to the combination of the embodiments of FIGS. 3 and 4. Therefore, only those differences between the embodiment of FIG. 5 and the combination of the embodiments of FIGS. 3 and 4 are explained with respect to FIG. 5. In FIG. 5, when CPU 101 determines that the amount of time that the portion of the image has been selected is greater than or equal to first time T1, in S110 (S110: Yes), flow may proceed to S120. In step S120, CPU 101 may determine whether the currently selected portion of the image in the image display section 11 is the first portion which the user selected in the image display section 11. When CPU 101 determines that the selected portion of the image in the image display section 11 is the first portion selected by the user in the image display section 11 (S120: Yes), flow may proceed to S150, and the scaling factor changing process may be performed with respect to the selected portion of the image in the image display section 11. Nevertheless, when CPU 101 determines that the selected portion of the image in the image display section 11 is not the first portion which the user selected in the image display section 11 (S120: No), flow may proceed to S130. In S130, the scaled display section 12 may be divided into a first scaled image display portion 12a and a second scaled image display portion 12b, and the currently selected portion of the image in the image display section 11 may be displayed in the first scaled image display portion 12a, while the previously selected portion is displayed in the second scaled image display portion 12b. Then, flow proceeds to S150, in which step S150 is performed with respect to the currently selected portion of the image in the image display section 11 displayed in the first scaled image display portion 12a.

Figure 10A:
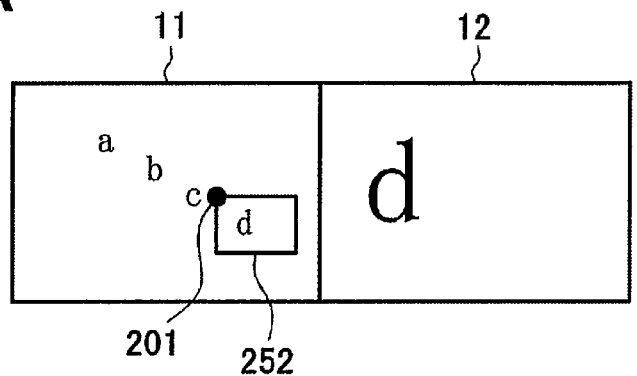
FIGS. 10A-10C are schematics of the image display section and the scaled image display section, according to the embodiment of FIG. 5.
Figure 10B:
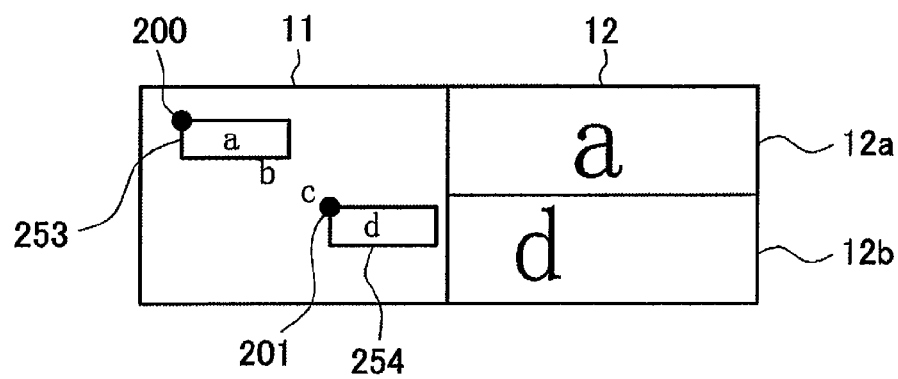
Figure 10C:
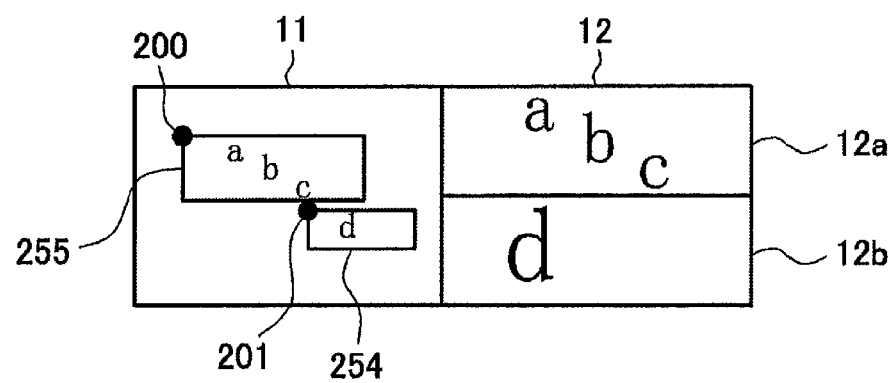

Examples of images which may be generated using the method of FIG. 5 are depicted in FIGS. 10A-10C. When a point 201 is selected on the image display section 11, as shown in FIG. 10A, a rectangle 252 may be generated. A portion of the image defined in rectangle 252 may be displayed in the scaled image display section 12. When another point 200, shown in FIG. 10B, subsequently is selected, the scaled image display section 12 may be divided, e.g., equally, into the first scaled image display portion 12a and the second image display portion 12b. Moreover, rectangles 253, 254 may be generated in the image display section 11 based on points 200, 201, respectively, and the selected portions of the image in the image display section 11, which are defined by rectangles 253, 254, respectively, may be displayed in first and second scaled image display portions 12a, 12b, respectively.

When the scaled image display section 12 is divided into first and second scaled image display portions 12a, 12b, the size of rectangle 252, shown in FIG. 10A, may be changed to the size of rectangle 254, as shown in FIG. 10B. When point 200, as shown in FIG. 10B, is continuously selected, the scaling factor associated with the portion of the image displayed in the first scaled image display portion 12a may be reduced, and the size of rectangle 253 may increase to the size of a rectangle 255, as shown in FIG. 10C. Moreover, a greater portion of the image in the image display section 11 may be displayed in the first scaled image display portion 12a, as shown in FIG. 10C.

Figure 6:
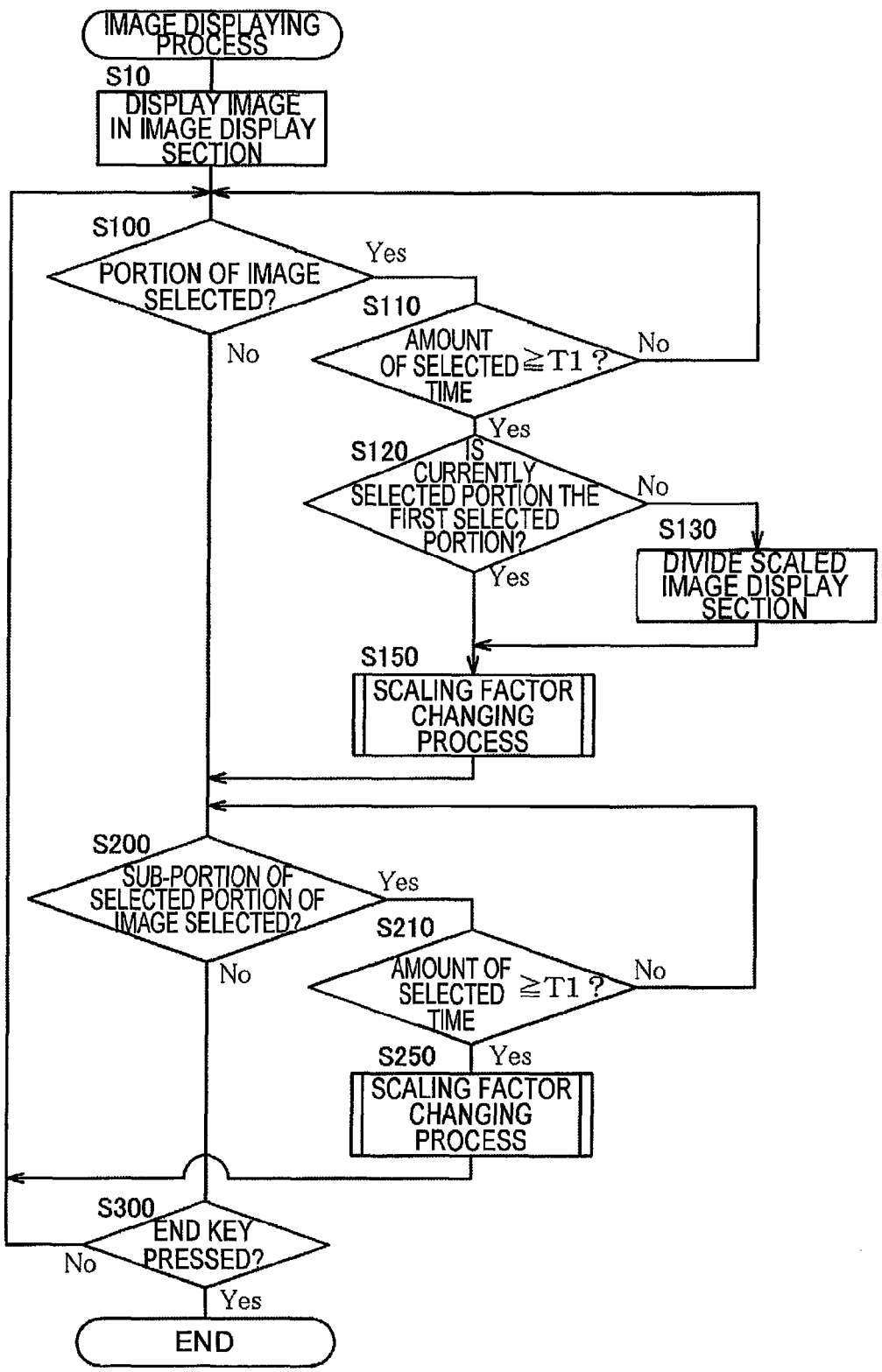
FIG. 6 is a flowchart of an image displaying process, according to yet another embodiment of the present invention.

Referring to FIG. 6, yet another embodiment according to the present invention is depicted. The embodiment of FIG. 6 is substantially similar to the embodiment of FIG. 5. Therefore, only those differences between the embodiment of FIG. 6 and the embodiment of FIG. 5 are discussed with respect to FIG. 6. In FIG. 6, steps S200-S250 have been added. In this embodiment of the present invention, after S150, flow may proceed to S200. In S200, CPU 101 may determine whether a sub-portion of selected portion of the image displayed in the scaled image display section 12 has been selected. When CPU 101 determines that the sub-portion has been selected (S200: Yes), flow proceeds to S210. When CPU 101 determines that the sun-portion has not been selected (S200: No), flow proceeds to S300. In S300, CPU 101 determines whether the end key has been selected (S300: Yes, the image displaying process ends; No: flow returns to S:100). In S210, CPU 101 may determine whether the amount of time that the sub-portion has been continuously selected is greater than or equal to the first amount of time, which corresponds to first time T1.

When CPU 101 determines that the amount of time that the sub-portion has been selected is greater than or equal to first time T1 (S210: Yes), flow may proceed to S250 where a scaling factor changing process, according to another embodiment of the present invention, may be performed. When CPU 101 determines that the amount of time that the sub-portion has been selected is less than first time T1 (S210: No), flow may return to S200.

Figure 7:
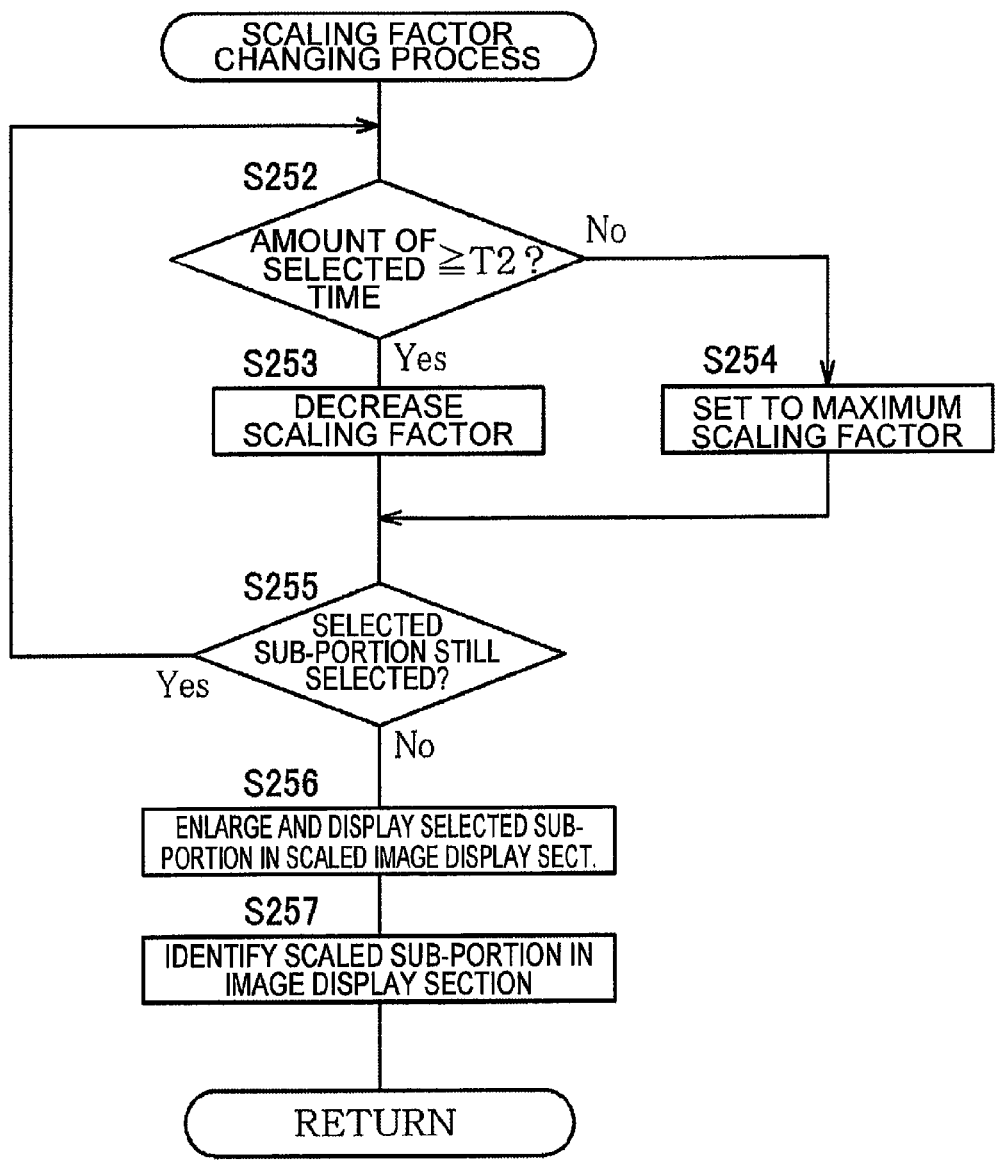
FIG. 7 is a flowchart of a scaling factor changing process, according to another embodiment of the present invention.

Referring to FIG. 7, S250 comprises S252-S257. In S252, CPU 101 determines whether the amount of time that the sub-portion has been selected is greater than or equal to second time T2. When CPU 101 determines that the amount of time that the sub-portion has been selected is greater than or equal to second time T2 (S252: Yes), flow proceeds to S253. In S253, a current scaling factor is determined. For example, as shown in FIG. 14, the current scaling factor may decrease as the time differential between the current time and second time T2 increases. Flow then proceeds to S255. Nevertheless, if CPU 101 determines that the amount of time that the sub-portion has been selected is less than second time T2 (S252: No), flow proceeds to S254. In S254, the scaling factor is set to a maximum scaling factor, and flow proceeds to S255.

In S255, CPU 101 may determine whether the selected sub-portion still is selected. When CPU 101 determines that the selected sub-portion still is selected (S255: Yes), flow may return to S252, and the scaling factor changing process S250 may be repeated, e.g., the scaling factor may be continuously reduced until either CPU 101 determines that the selected sub-portion no longer is selected or a minimum scaling factor is reached. When CPU 101 determines that the selected sub-portion no longer is selected (S255: No), the process flows to S256.

In S256, the selected sub-portion may be enlarged and displayed in the scaled image display section 12 based on the finally reached scaling factor reached during S252-S255. Flow then proceed to S257. In S257, the scaled sub-portion displayed in the scaled image display section 12 may be identified in the image display section 11. For example, a frame, e.g., a rectangular frame, may be depicted in the image display section 11, which surrounds those portions of the image which are displayed in the scaled image display section 12.

Figure 11A:
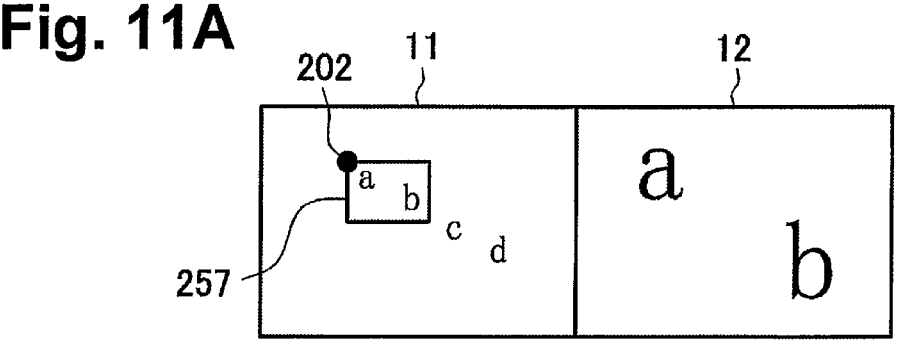
FIGS. 11A-11C are schematics of the image display section and the scaled image display section, according to the embodiment of FIG. 6.

As shown in FIG. 11A, for example, a point 202 may be selected on the image display section 11, and the dimensions of a rectangle 257 may be determined. The portion of the image in the image display section 11 defined in rectangle 257 may be displayed in the scaled image display section 12.

Figure 11B:
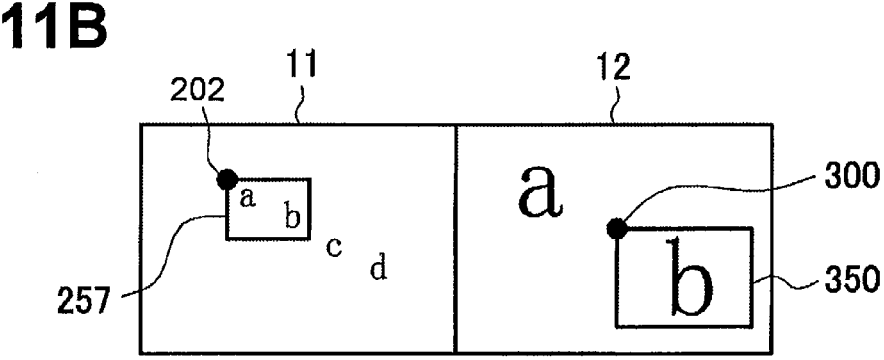

Then, a user may designate, for example, a point 300, as shown in FIG. 11B, on the scaled image display section 12, e.g., by touching touch screen 22 with a finger or a pen. With the selection of point 300, a rectangle 350 may be generated, which corresponds to the sub-portion of the image displayed in the scaled image display section 12. When the sub-portion continuously is selected and the scaling factor of the sub-portion is reduced, the size of rectangle 350 may increase. Rectangle 350 may be identified in the scaled image display section 12, as shown in FIG. 11B.

Figure 11C:
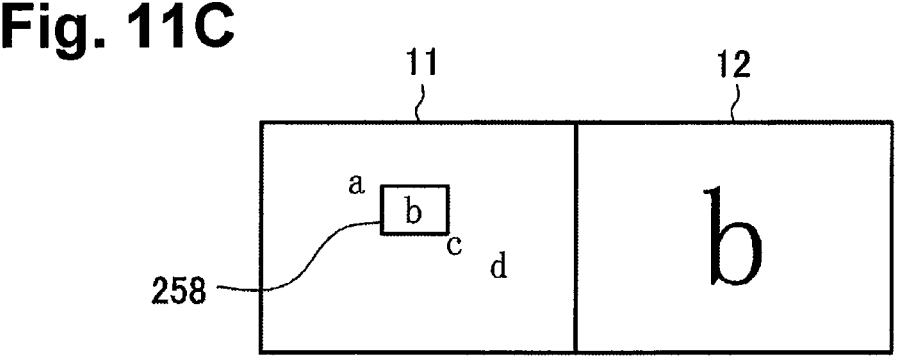

The portion of the image defined in rectangle 350 may be enlarged and displayed in the scaled image display section 12, while the non-selected portion of the image in the scaled image display section 12 is removed, as shown in FIG. 11C. A rectangle 258 may be displayed in the image display section 11 to identify the sub-portion of the image enlarged and displayed in the scaled image display section 12.

Figure 12A:
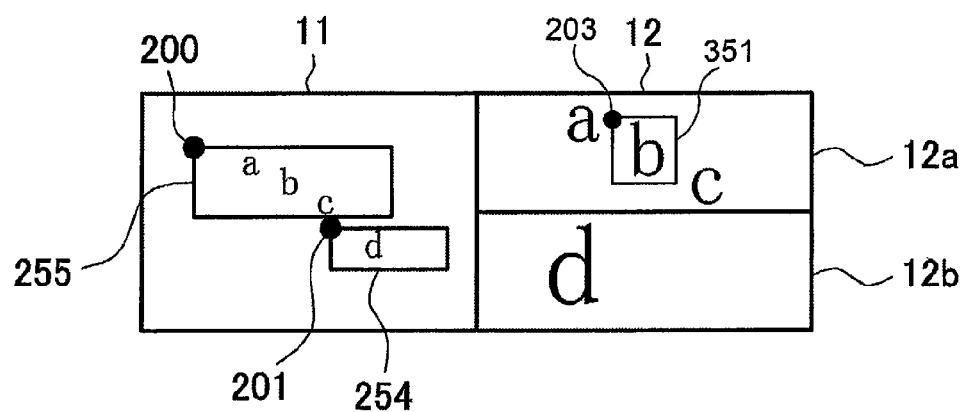
FIGS. 12A and 12B are schematics of the image display section and the scaled image display section, according to the embodiment of FIG. 6.
Figure 12B:
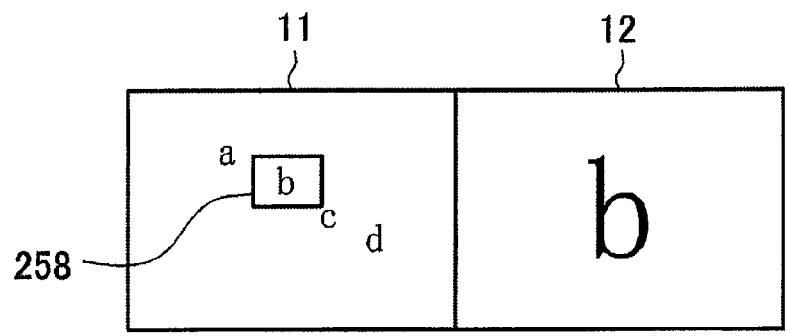

When the scaled image display section 12 is divided into a plurality of portions, for example, two areas 12a, 12b, as shown in FIG. 12A, a point 203 may be selected on the scaled image display section 12, and a rectangle 351 may be generated. In this case, a portion of the image defined in rectangle 351 may be enlarged and displayed in the scaled image display section 12, as shown in FIG. 12B.

Figure 13A:
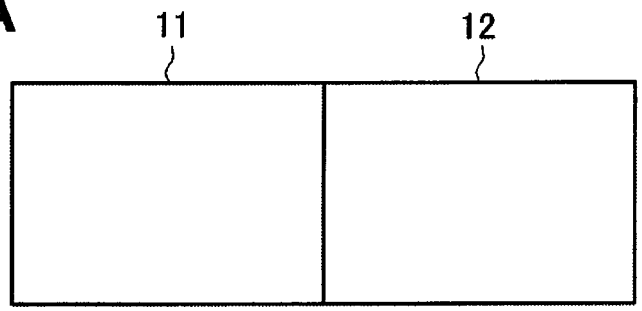
FIGS. 13A-13C are schematics showing arrangements of the image display section and the scaled image display section, according to embodiments of the present invention.
Figure 13B:
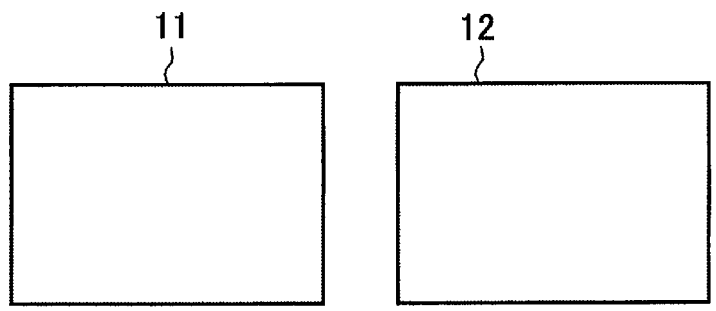
Figure 13C:
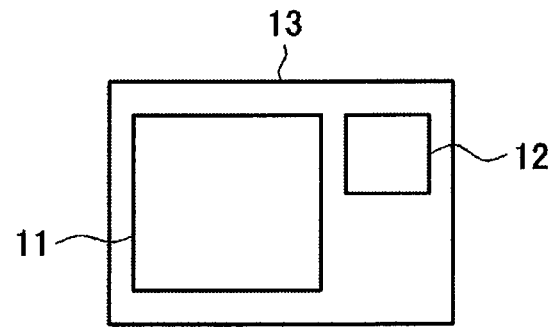

FIGS. 13A-13C show arrangements of the image display section 11 and the scaled image display section 12. The above embodiments are discussed in conjunction with the arrangement of image display sections 11, 12 shown in FIG. 13A, in which image display sections 11, 12 are connected to each other. Nevertheless, the arrangements of image display sections 11, 12 are not limited to such arrangement shown in FIG. 13A. For example, as shown in FIG. 13B, image display sections 11, 12 may be disposed adjacent to each other with some distance therebetween. Further, as shown in FIG. 13C, image display sections 11, 12 may be disposed, as two separate areas, on a same display 13.

While the invention has been described in connection with various example structures and illustrative embodiments, it will be understood by those skilled in the art that other variations and modifications of the structures and embodiments described above may be made without departing from the scope of the invention. Other structures and embodiments will be apparent to those skilled in the art from a consideration of the specification or practice of the invention disclosed herein. It is intended that the specification and the described examples are illustrative with the true scope of the invention being defined by the following claims.

What is claimed is:
1. A method of scaling, comprising the steps of:
receiving an image;
displaying the received image;
determining whether an input associated with the image at a point of the displayed image has been received;
selecting a portion of the image based on the point of the input after the input has been received;

determining whether the input at the point continuously has been received for at least a first predetermined amount of time after determining that the input has been received;

determining whether the input at the point continuously has been received for more than a second predetermined amount of time greater than the first predetermined amount of time after determining that the input at the point continuously has been received for at least the first predetermined amount of time;

determining a scaling factor based on an amount of time that the input at the point continuously has been received, wherein, when the amount of time is greater than or equal to the first predetermined amount of time and less than the second predetermined amount of time, the scaling factor is determined to be a predetermined maximum scaling factor, and wherein, when the amount of time is greater than or equal to the second predetermined amount of time, the scaling factor is determined to be another scaling factor less than the predetermined maximum scaling factor, wherein the another scaling factor reduces gradually as time elapses;

scaling the portion of the image based on the scaling factor to generate a scaled portion of the image; and displaying the scaled portion of the image adjacent to the image.

2. The method of claim 1, further comprising the steps of:
determining whether the input at the point still is being received after displaying the scaled portion of the image;
changing the scaling factor based on the amount of time that the input at the point continuously has been received to generate a changed scaling factor;
scaling the portion of the image based on the changed scaling factor to generate a changed, scaled portion of the image; and
replacing the scaled portion of the image with the changed, scaled portion of the image.

3. The method of claim 2, wherein the changed scaling factor is less than the scaling factor.

4. The method of claim 1, further comprising the step of displaying an identifier within the image after the scaled portion of the image is displayed, wherein the identifier corresponds to the scaled portion of the image.

5. The method of claim 1, further comprising the steps of:
determining whether a further input associated with the image at a second point has been received;
selecting a further portion of the image based on the second point of the further input after the further input has been received;
determining whether the further input at the second point continuously has been received for at least the first predetermined amount of time after determining that the further input has been received;
determining whether the further input at the second point continuously has been received for more than the second predetermined amount of time after determining that the further input at the second point continuously has been received for at least the first predetermined amount of time;
determining a further scaling factor based on an amount of time that the further input at the second point continuously has been received;
scaling the further portion of the image based on the further scaling factor to generate a scaled further portion of the image; and displaying the scaled further portion of the image adjacent to the image and adjacent to the scaled portion of the image.

6. The method of claim 1, further comprising the steps of:
determining whether a particular input associated with the scaled portion of the image at a third point of the scaled portion of the image has been received;
selecting a sub-portion of the scaled portion of the image based on the third point of the particular input after the particular input has been received;
determining whether the particular input at the third point continuously has been received for at least the first predetermined amount of time after determining that the particular input has been received;
determining whether the particular input at the third point continuously has been received for more than the second predetermined amount of time after determining that the particular input continuously has been received for at least the first predetermined amount of time;
determining a particular scaling factor based on an amount of time that the particular input at the third point continuously has been received;
determining whether the particular input at the third point still is being received after determining the particular scaling factor;
scaling the sub-portion of the scaled portion of the image based on the particular scaling factor to generate a scaled sub-portion of the image; and
replacing the scaled portion of the image with the scaled sub-portion of the image.

7. An image processing device comprising:
means for receiving an image;
means for displaying the received image;
means for determining whether an input associated with the image at a point of the displayed image has been received;
means for selecting a portion of the image based on the point of the input after the input has been received;
means for determining whether the input at the point continuously has been received for at least a first predetermined amount of time after determining that the input has been received;
means for determining whether the input at the point continuously has been received for more than a second predetermined amount of time greater than the first predetermined amount of time after determining that the input at the point continuously has been received for at least the first predetermined amount of time;
means for determining a scaling factor based on an amount of time that the input at the point continuously has been received, wherein, when the amount of time is greater than or equal to the first predetermined amount of time and less than the second predetermined amount of time, the scaling factor is determined to be a predetermined maximum scaling factor, and wherein, when the amount of time is greater than or equal to the second predetermined amount of time, the scaling factor is determined to be another scaling factor less than the predetermined maximum scaling factor, wherein the another scaling factor reduces gradually as time elapses;
means for scaling the portion of the image based on the scaling factor to generate a scaled portion of the image; and
means for displaying the scaled portion of the image adjacent to the image.

8. The image processing device of claim 7, further comprising:

means for determining whether the input at the point still is being received after displaying the scaled portion of the image;

means for changing the scaling factor based on the amount of time that the input at the point continuously has been received to generate a changed scaling factor;

means for scaling the portion of the image based on the changed scaling factor to generate a changed, scaled portion of the image; and means for replacing the scaled portion of the image with the changed, scaled portion of the image.

9. The image processing device of claim 8, wherein the changed scaling factor is less than the scaling factor.

10. The image processing device of claim 7, further comprising means for displaying an identifier within the image after the scaled portion of the image is displayed, wherein the identifier corresponds to the scaled portion of the image.

11. The image processing device of claim 7, further comprising:

means for determining whether a further input associated with the image at a second point has been received;

means for selecting a further portion of the image based on the second point of the further input after the further input has been received;

means for determining whether the further input at the second point continuously has been received for at least the first predetermined amount of time after determining that the further input has been received;

means for determining whether the further input at the second point continuously has been received for more than the second predetermined amount of time after determining that the further input at the second point continuously has been received for at least the first predetermined amount of time;

means for determining a further scaling factor based on an amount of time that the further input at the second point continuously has been received;

means for scaling the further portion of the image based on the further scaling factor to generate a scaled further portion of the image; and means for displaying the scaled further portion of the image adjacent to the image and adjacent to the scaled portion of the image.

12. The image processing device of claim 7, further comprising:

means for determining whether a particular input associated with the scaled portion of the image at a third point of the scaled portion of the image has been received;

means for selecting a sub-portion of the scaled portion of the image based on the third point of the particular input after the particular input has been received;

means for determining whether the particular input at the third point continuously has been received for at least the first predetermined amount of time after determining that the particular input has been received;

means for determining whether the particular input at the third point continuously has been received for more than the second predetermined amount of time after determining that the particular input continuously has been received for at least the first predetermined amount of time;

means for determining a particular scaling factor based on an amount of time that the particular input at the third point continuously has been received;

means for determining whether the particular input at the third point still is being received after determining the particular scaling factor;

means for scaling the sub-portion of the scaled portion of the image based on the particular scaling factor to generate a scaled sub-portion of the image; and means for replacing the scaled portion of the image with the scaled sub-portion of the image.

13. An image processing device comprising:

a display device comprising:
  a first display portion configured to display an image;
  a second display portion positioned adjacent to the first display portion; and
  an input receiving portion configured to receive an input; and a computer processing unit configured to:
  determine whether an input associated with the image at a point of the displayed image has been received;
  select a portion of the image based on the point of the input;
  determine whether the input receiving portion continuously has received the input at the point for at least a first predetermined amount of time;
  determine whether the input receiving portion continuously has received the input at the point for more than a second predetermined amount of time greater than the first predetermined amount of time;
  determine a scaling factor based on an amount of time that the input receiving portion continuously has received the input at the point, wherein, when the amount of time is greater than or equal to the first predetermined amount of time and less than the second predetermined amount of time, the scaling factor is determined to be a predetermined maximum scaling factor, and wherein, when the amount of time is greater than or equal to the second predetermined amount of time, the scaling factor is determined to be another scaling factor less than the predetermined maximum scaling factor, wherein the another scaling factor reduces gradually as time elapses; and
  scale the portion of the image based on the scaling factor to generate a scaled portion of the image, wherein the second portion is configured to display the scaled portion of the image.

14. The image processing device of claim 13, wherein the computer processing unit is further configured to:

determine whether the input at the point still is being received after displaying the scaled portion of the image;

change the scaling factor based on the amount of time that the input at the point continuously has been received to generate a changed scaling factor;

scale the portion of the image based on the changed scaling factor to generate a changed, scaled portion of the image; and replace the scaled portion of the image with the changed, scaled portion of the image.

15. The image processing device of claim 14, wherein the changed scaling factor is less than the scaling factor.

16. The image processing device of claim 13, wherein the first portion of the display device is further configured to display an identifier within the image, wherein the identifier corresponds to the scaled portion of the image.

17. The image processing device of claim 13, wherein the computer processing unit is further configured to:

determine whether a further input associated with the image at a second point has been received;

select a further portion of the image based on the second point of the further input after the further input has been received;

determine whether the further input at the second point continuously has been received for at least the first predetermined amount of time after determining that the further input has been received;

determine whether the further input at the second point continuously has been received for more than the second predetermined amount of time after determining that the further input at the second point continuously has been received for at least the first predetermined amount of time;

determine a further scaling factor based on an amount of time that the further input at the second point continuously has been received; and scale the further portion of the image based on the further scaling factor to generate a scaled further portion of the image, wherein the second portion of the display device is further configured to display the scaled further portion of the image adjacent to the image and adjacent to the scaled portion of the image.

18. The image processing device of claim 13, wherein the computer processing unit is further configured to:

determine whether a particular input associated with the scaled portion of the image at a third point of the scaled portion of the image has been received;

select a sub-portion of the scaled portion of the image based on the third point of the particular input after the particular input has been received;

determine whether the particular input at the third point continuously has been received for at least the first predetermined amount of time after determining that the particular input has been received;

determine whether the particular input at the third point continuously has been received for more than the second predetermined amount of time after determining that the particular input continuously has been received for at least the first predetermined amount of time;

determine a particular scaling factor based on an amount of time that the particular input at the third point continuously has been received;

determine whether the particular input at the third point still is being received after determining the particular scaling factor;

scale the sub-portion of the scaled portion of the image based on the particular scaling factor to generate a scaled sub-portion of the image; and and replace the scaled portion of the image with the scaled sub-portion of the image.

19. An image processing device comprising:

a first display section configured to display an image;

an input receiving device configured to receive an input associated with the image at a point of the displayed image;

a computer processing unit configured to:

determine a selected portion of the image based on the point of the input;

reduce a scaling factor associated with the selected portion of the image, from a predetermined maximum scaling factor, gradually as an amount of time that the input receiving device continuously receives the input at the point increases; and apply the scaling factor to the selected portion of the image to generate a scaled image corresponding to the selected portion of the image, such that the scaled image is a scaled selected portion of the image; and a second display section configured to display the scaled selected portion of the image.

20. The image processing device of claim 19, wherein the second display device is adjacent to the first display device.

21. A method of scaling, comprising the steps of:

displaying an image;

receiving an input associated with the image at a point of the displayed image;

determining a selected portion of the image based on the point of the input;

reducing a scaling factor associated with the selected portion of the image, from a predetermined maximum scaling factor, gradually as an amount of time that the input receiving device continuously receives the input at the point increases;

applying the scaling factor to the selected portion of the image to generate a scaled image corresponding to the selected portion of the image, such that the scaled image is a scaled selected portion of the image; and displaying the scaled selected portion of the image.

22. The method of claim 21, wherein the scaled portion of the image is displayed adjacent to the image.

* * * * *